United States Patent
Onoda et al.

(10) Patent No.: US 8,539,674 B2
(45) Date of Patent: Sep. 24, 2013

(54) METHOD OF ASSEMBLING A GEARSHIFT MEMBER TO A STEERING WHEEL MAIN BODY

(75) Inventors: Atsushi Onoda, Nagoya (JP); Yoshitoku Uesaka, Inazawa (JP); Nobuyuki Ishigure, Gifu (JP); Keiji Nagaya, Aichi-ken (JP); Shinichi Saiki, Aichi-ken (JP); Fumitaka Hayase, Aichi-ken (JP)

(73) Assignees: Toyota Jidosha Kabushiki Kaisha, Toyota-shi (JP); Toyoda Gosei Co., Ltd., Kiyosu-shi (JP); Kabushiki Kaisha Tokai Rika Denki Seisakusho, Niwa-gun (JP)

( * ) Notice: Subject to any disclaimer, the term of this patent is extended or adjusted under 35 U.S.C. 154(b) by 1241 days.

(21) Appl. No.: 12/395,740

(22) Filed: Mar. 2, 2009

(65) Prior Publication Data
US 2009/0266197 A1    Oct. 29, 2009

(30) Foreign Application Priority Data
Feb. 29, 2008    (JP) .................................. 2008-49741

(51) Int. Cl.
*B21D 53/26*    (2006.01)
*B60K 20/06*    (2006.01)

(52) U.S. Cl.
USPC ...... 29/894.1; 29/469; 29/525.11; 29/525.01; 29/893.1; 74/552

(58) Field of Classification Search
USPC ........... 29/893.1, 894.1, 469, 525.01, 525.11; 74/552
See application file for complete search history.

(56) References Cited

U.S. PATENT DOCUMENTS
| | | | |
|---|---|---|---|
| 5,160,228 A * | 11/1992 | Arai et al. | 407/32 |
| 5,228,362 A * | 7/1993 | Chen et al. | 74/552 |
| 7,685,906 B2 * | 3/2010 | Schutz | 74/552 |

FOREIGN PATENT DOCUMENTS
| | | | |
|---|---|---|---|
| JP | 62125664 | | 8/1987 |
| JP | 07189369 A | * | 7/1995 |
| JP | 10338146 | | 12/1998 |
| JP | 2003118417 | | 4/2003 |

OTHER PUBLICATIONS
JP 10-338146 A.*

* cited by examiner

*Primary Examiner* — Sarang Afzali
(74) *Attorney, Agent, or Firm* — Gifford, Krass, Sprinkle, Anderson & Citkowski, P.C.

(57) ABSTRACT

A paddle shift member 20 is positioned to the rear surface side of a wheel lower cover 12 by engaging the paddle shift member 20 to the wheel lower cover 12. The wheel lower cover 12 to which the paddle shift member 20 has been positioned is installed to the rear surface side of a steering wheel main body. Then the paddle shift member 20 is connected to the steering wheel main body by screwing a tapping screw T into the paddle shift 20 via the steering wheel main body from the front surface side of the steering wheel main body to which the wheel lower cover 12 has been installed. According to this method, the paddle shift member 20 is assembled to the steering wheel main body without inverting the core 11.

3 Claims, 13 Drawing Sheets

FIG.7 C-C Cross-Sectional View

FIG.8

D-D Cross-Sectional View

FIG.9

E-E Cross-Sectional View

FIG.10

F-F Cross-Sectional View

FIG.11

G-G Cross-Sectional View

METHOD OF ASSEMBLING A GEARSHIFT MEMBER TO A STEERING WHEEL MAIN BODY

CROSS REFERENCE TO RELATED APPLICATIONS

This application claims priority of Japanese Patent Application No. 2008-49741, filed Feb. 29, 2008, which is incorporated herein by reference.

BACKGROUND OF THE INVENTION

1. Field of the Invention

The present invention relates to a method of assembling a gearshift member to a steering wheel main body, a steering wheel, and a gearshift member assembled to a steering wheel main body of the steering wheel.

2. Description of the Related Art

A gearshift member installed to a rear surface side (vehicle frontward side) of a steering wheel of a vehicle is known. This gearshift member is configured to shift the gears of a transmission of a vehicle when operated by a driver holding the steering wheel. Such gearshift member is referred to as a paddle shift member from the appearance configuration of the operation part and shows increasing popularity mainly with sports-type vehicles. The gearshift member is generally disposed in pairs at opposing left and right positions of the steering wheel. The driver shifts the gears of the transmission by pressing one operation member to shift the transmission up, and another operation member to shift the transmission down. Such a gearshift member is described in JP2003-118417A.

SUMMARY OF THE INVENTION

The gearshift member is generally fixed to the rear surface side of the steering wheel, particularly to the rear surface side of the steering wheel main body of the steering wheel. To assemble the gearshift member, the gearshift member is connected to the steering wheel (steering wheel main body) by a tapping screw or the like which is screwed from the rear surface side of the steering wheel. The steering wheel is inverted to screw the tapping screw into the rear surface side of the steering wheel. After the gearshift member has been assembled, the steering wheel (steering wheel main body) is inverted once again to perform subsequent work. As a result, the worker has to invert the steering wheel twice. Accordingly, the number of assembly man-hours increase.

The present invention has been made to overcome such problems, and it is an object of the present invention to provide an assembly method of a gearshift member that does not require inversion of the steering wheel, thereby resulting in a decrease in the number of assembly man-hours.

Also, when the gearshift member is connected to the steering wheel (steering wheel main body) by a screw, the gearshift member should be prevented from co-turning simultaneously with the screw. In the prior art, the gearshift member is connected to the steering wheel by a tapping screw in at least two different locations to prevent from co-turning. This results in the problem of an increase in the number of tapping screws and installation man-hours. Furthermore, a bracket is used to ensure two suitable locations to fix the gearshift member by the tapping screws. This results in the problem of an increase in the number of parts for assembling.

Therefore, the present invention also has been made to overcome such problems, and it is an object of the present invention to provide a gearshift member and a steering wheel that prevents increases in the number of parts and installation man-hours.

The first aspect of the present invention is a method of assembling a gearshift member configured to shift the gears of a transmission of a vehicle to a steering wheel having a steering wheel main body and a wheel lower cover installed to the steering wheel main body, comprising a positioning step of positioning the gearshift member by engaging the gearshift member to the wheel lower cover; a lower cover installing step of installing the wheel lower cover, to which the gearshift member has been positioned and engaged, to a rear surface side of the steering wheel main body; and a connecting step of connecting the gearshift member to the rear surface side of the steering wheel main body by screwing a screw member into the gearshift member via the steering wheel main body from a front surface side of the steering wheel main body.

According to the present invention, the gearshift member is first engaged to the wheel lower cover for positioning the gearshift member in relation to the wheel lower cover. Next, the wheel lower cover to which the gearshift member has been positioned and temporarily fixed is then installed to the rear surface side of the steering wheel main body by a worker positioned on the front surface side of the steering wheel main body. Subsequently, the screw member is inserted into the steering wheel main body from the front surface side of the steering wheel main body by the worker positioned on the front surface side of the steering wheel main body. The screw member is screwed into the gearshift member via the steering wheel main body. As a result, the gearshift member is connected to the steering wheel main body. In this manner, the worker positioned at the front surface side of the steering wheel main body connects the gearshift member to the steering wheel main body by screwing the screw member from the front surface side of the steering wheel main body, thereby assembling the gearshift member to the steering wheel without inverting step of the steering wheel main body. Also, subsequent work after connecting the gear shift member to the steering wheel main body is performed without inverting the steering wheel main body. Accordingly, the gearshift member can be assembled to the steering wheel (steering wheel main body) without the inversion operation of the steering wheel (steering wheel main body). Thus, the number of assembly man-hours is decreased.

The aforementioned steering wheel main body refers to the main element of the steering wheel that transmits the steering torque from the driver to the steering shaft. The core that forms the framework of the steering wheel and the resin cover that covers the core (particularly the rim part of the core) correspond to the steering wheel main body. The front surface side of the steering wheel main body refers to the surface side facing the driver's seat direction (the vehicle rearward direction) when the steering wheel main body is installed in the vehicle. The rear surface side of the steering wheel main body refers to the surface side facing the direction opposite the driver's seat direction (the vehicle frontward direction).

The gearshift member preferably comprises a flat-shaped operation part operated by a driver and a housing configured to house a switch for transmitting an operation state of the operation part to the transmission of the vehicle. The operation part preferably comprises an operation surface operated by the driver. The housing is preferably disposed on one surface of the operation part, particularly on the surface opposite the operation surface. Additionally, the housing preferably comprises a side peripheral surface and bottom surface for marking a chamber that houses the switch. Then, in the positioning step, the gearshift member is preferably positioned to a specific position on the rear surface side of the wheel lower cover by engaging a housing side positioning means formed on the bottom surface of the housing to a lower cover side positioning means formed on the wheel lower cover. With this arrangement, the gearshift member is fixed temporarily with the wheel lower cover by engagement of both positioning means.

The steering wheel main body preferably comprises a boss part connected to a steering shaft of the vehicle, a gripping part gripped by a driver, and a spoke part configured to connect the boss part to the gripping part. Then, the gearshift member is preferably connected to the rear surface side of the spoke part in the connecting step. The horn, air bag, and the like are disposed in a storage space formed on the front surface side of the boss part of the steering wheel main body. If the gearshift member is connected to the boss part, a problem arises that the storage space decreases in size because a head part (bolt head) of a screw member for connecting the gearshift member and the steering wheel main body is positioned in the storage space. In the present invention, the gearshift member is connected to the spoke part by the screw member. Therefore, the head part (bolt head) of the screw member is positioned on the front surface side of the spoke part, thereby ensuring the storage space formed on the front surface side of the boss part. Furthermore, since functional parts are not built into the front surface side of the spoke part, the screw member can be inserted from the front surface side of the spoke part.

A hole is preferably formed on the bottom surface of the housing and a through-hole is preferably formed on the spoke part. When the gearshift member is positioned to the wheel lower cover in the positioning step, the hole of the housing is preferably exposed on a front surface side of the wheel lower cover. Here, the front surface side of the wheel lower cover refers to the surface of the side facing the steering wheel main body when the wheel lower cover is installed to the rear surface side of the steering wheel main body. When the wheel lower cover to which the gearshift member is positioned is installed to the rear surface of the steering wheel main body in the lower cover installing step, the hole of the housing is preferably positioned opposite the through-hole of the spoke part. That is, the hole faces with the through-hole. Then, when the gearshift member is connected to the rear surface side of the steering wheel main body by screwing the screw member in the connecting step, the screw member is inserted in the through-hole from the front surface side of the steering wheel main body, and screwed into the hole, thereby connecting the steering wheel main body and gearshift member. The hole is preferably formed on a raised part formed on the bottom surface of the housing. With the formation of this raised part, it is possible to prevent the screw member from reaching the inner space of the housing.

A convex part is preferably formed vertically on the bottom surface of the housing. This convex part is exposed on the front surface side of the wheel lower cover when the gearshift member is positioned to the wheel lower cover in the positioning step. The convex part is configured to engage with the spoke part when the screw member is screwed into the gearshift member in the connecting step, thereby preventing the co-turning of the gearshift member. The convex part preferably comprises at least two wall-shaped members formed vertically in a wall shape from the bottom surface of the housing. The two wall-shaped members preferably have surfaces facing each other (opposing surfaces) so that the spoke part is fit between the opposing surfaces when the wheel lower cover is installed to the rear surface side of the steering wheel main body in the lower cover installing step. With this arrangement, the convex part engages to the spoke part. The engagement prevents the gearshift member from turning concurrently with the screw member when the screw member is screwed into the gearshift member. Therefore, unlike the assembly method of the prior art that connects the gearshift member to the steering wheel main body at two connecting locations, the gearshift member can be connected at one connecting location. As a result, the gearshift member is connected to the steering wheel main body by using only one screw member. Then, it is possible to decrease the number of parts. In addition, the strength of the steering wheel main body can be ensured when the gearshift member is connected to the spoke member that is relatively thin and inferior in strength. Further, the gearshift member can be connected to the steering wheel main body without using the bracket used for ensuring a plurality of connecting locations when two or more screws are used for connecting, thereby make it possible to decrease the number of parts.

Further, another aspect of the present invention is a steering wheel comprising a steering wheel main body having a boss part to which a steering shaft of a vehicle is connected, a gripping part gripped by a driver, and a spoke part configured to connect the boss part and the gripping part, and a wheel lower cover that is installed to a rear surface side of the steering wheel main body, wherein a gearshift member configured to shift the gears of a transmission of a vehicle is positioned to said wheel lower cover and assembled to a rear surface side of said wheel main body. The gearshift member comprises a flat-shaped operation part operated by a driver, and a housing disposed on one surface of the operation part that houses a switch for transmitting an operation state of the operation part to the transmission of the vehicle. Then, the housing is connected to the spoke part of the steering wheel main body by a screw member inserted from a front surface side of the steering wheel main body. The screw member is preferably inserted from the front surface side of the spoke part, and the housing is preferably connected to the rear surface side of the spoke part by the screw member. Further, a convex part is preferably formed vertically on a bottom surface of the housing. The convex part preferably protrudes from the bottom surface of the housing and engages to the spoke part.

According to the above aspect of the present invention, the housing (particularly, the bottom surface of the housing) of the gearshift member is connected to the rear surface of the steering wheel main body (particularly, the spoke part) by the screw member inserted from the front surface side of the steering wheel main body. Therefore, the gearshift member is installed to the steering wheel main body without inverting the steering wheel main body. Thus, the number of assembly man-hours is decreased.

Further, another aspect of the present invention is a gearshift member that shifts the gears of a transmission of a vehicle and is installed on a rear surface side of a steering wheel main body comprising a boss part to which a steering shaft of the vehicle is connected, a gripping part gripped by a driver, and a spoke part configured to connect the boss part to the gripping part, comprising a flat-shaped operation part having an operation surface operated by the driver, and a housing disposed on the opposite surface of the operation surface of the operation part, and houses a switch for transmitting an operation state of the operation part to the transmission of the vehicle, wherein a bottom surface of the housing is connected to a rear surface side of the spoke part by a screw member inserted from the front surface side of the steering wheel main body.

According to the above aspect of the present invention, the gearshift member comprises the flat-shaped operation part and the housing. Since the housing is disposed on one surface (the surface on the side opposite the operation surface) of the operation part, the gearshift member is constructed compactly and the size of the gearshift member is minimized. Furthermore, the minimized size contributes to connect the gearshift member with the spoke part of the steering wheel main body easily.

Preferably, a housing side positioning means is formed on the bottom surface of the housing and a lower cover side positioning means is formed on a wheel lower cover that is provided on the rear surface side of the steering wheel main body. Then the housing side positioning means is engaged to the lower cover side positioning means. With this arrangement, the gearshift member is reliably positioned to the wheel lower cover when the gearshift member is fixed to the steering wheel main body.

Further, a hole into which a screw member for connecting the gearshift member to the spoke part is screwed is preferably formed on the bottom surface of the housing, and a convex part which engages to the spoke part for preventing the co-turning of the gearshift member when the screw member is screwed into the hole is preferably formed vertically on the bottom surface of the housing. In this case, the convex part is preferably provided with a rib for reinforcing the housing. The convex part preferably comprises at least two wall-shaped members formed vertically in a wall shape from the bottom surface of the housing, and two wall-shaped members preferably comprise surfaces facing each other (opposing surfaces) so that the spoke part is fit between the opposing surfaces and thus engaged to wall-shaped members. With this arrangement, the convex part is engaged to the spoke part, thereby preventing the co-turning of the gearshift member when the screw member is screwed into the hole formed on the bottom surface of the housing. Therefore, the gearshift member does not co-turn with the screw member even if the gearshift member is connected to the steering wheel main body by single screw member. Further, since the through-holes through which the screw member is insert is formed at single location in the steering wheel main body, the strength of the steering wheel main body is larger than the strength of the steering wheel main body which the through-holes are formed at plural locations. Furthermore, the bracket is not required. This contributes to decrease the number of parts.

DETAILED DESCRIPTION OF PREFERRED EMBODIMENTS

Figure 1:
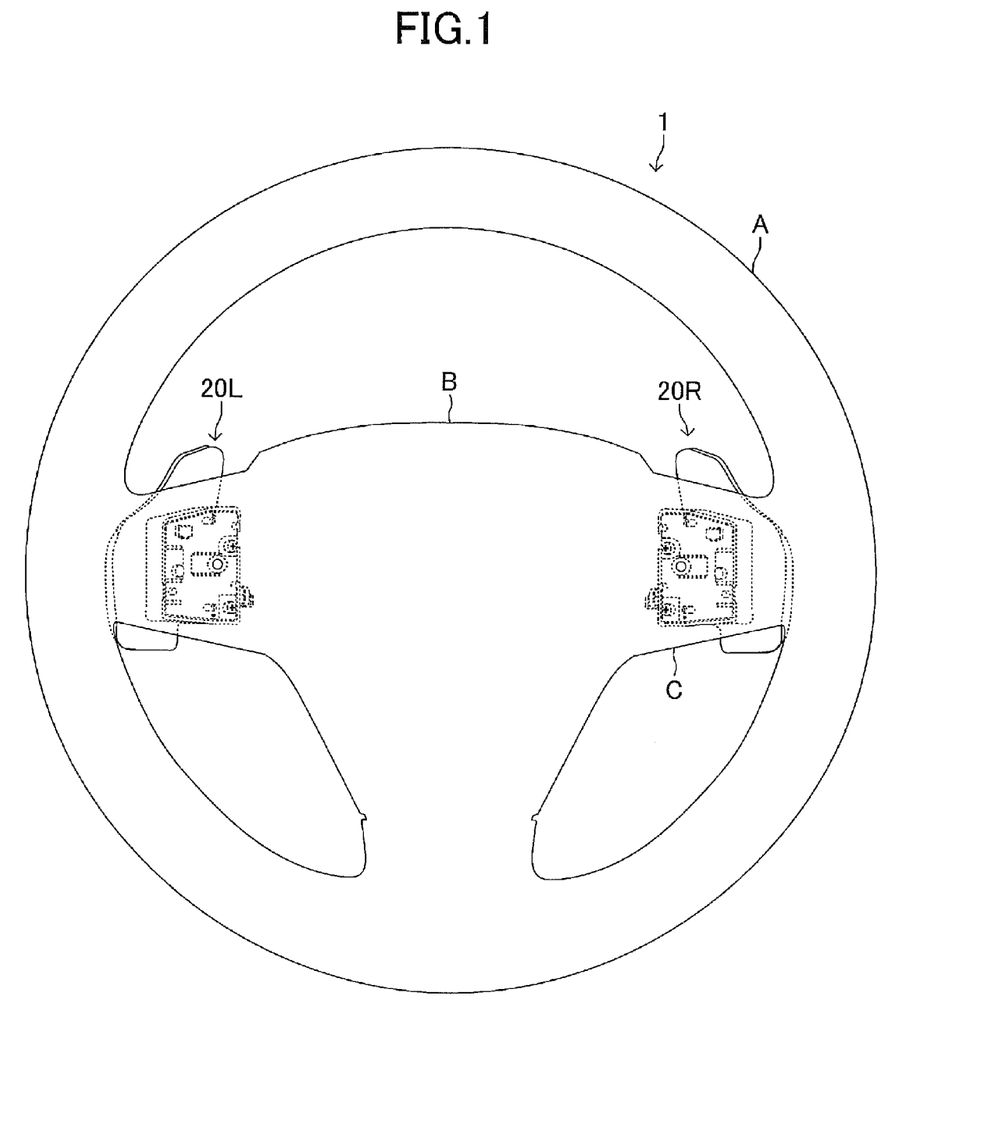
FIG. 1 is a front view of a steering wheel according to the present embodiment.

In the following, an embodiment of the present invention will be described with reference to the accompanying drawings. FIG. 1 is a front view of a steering wheel according to the present embodiment. As shown in FIG. 1, the steering wheel 1 has a ring-shaped part A, a center part B, and a connecting part C. The ring-shaped part A is formed like a ring shape. The center part B is disposed at the center of the ring-shaped part A. A horn, air bag, etc are disposed in the center part B. The connecting part C is configured to connect the ring-shaped part A and the center part B. In the figure, paddle shift members 20R and 20L, which correspond to the gearshift members of the present invention, are installed to the connecting part C that extends horizontally. These paddle shift members 20R and 20L are each installed to the rear surface side (the surface of the side opposite the driver's seat side) of the steering wheel 1. A driver, for example, operates the paddle shift member 20R located on the right side to shift up the transmission of the vehicle, and operates the paddle shift member 20L located on the left side to shift down the transmission.

Figure 2:
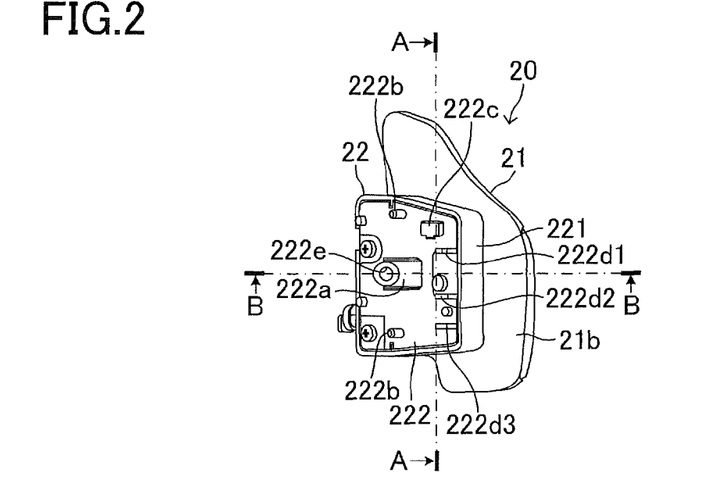
FIG. 2 is a view of the paddle shift member seeing from the driver's seat side.
Figure 3:
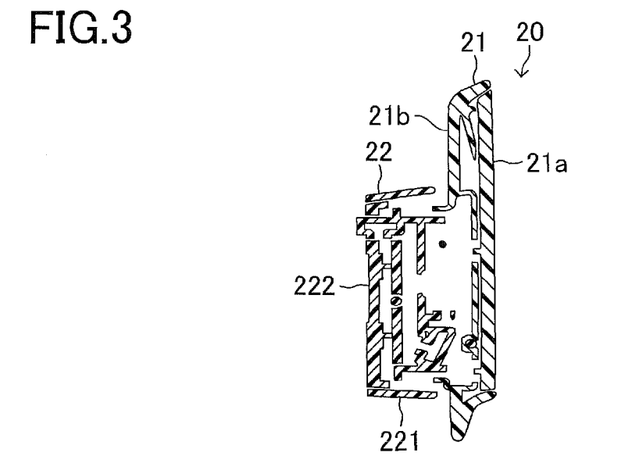
FIG. 3 is a cross-sectional view of section A-A of FIG. 2.
Figure 4:
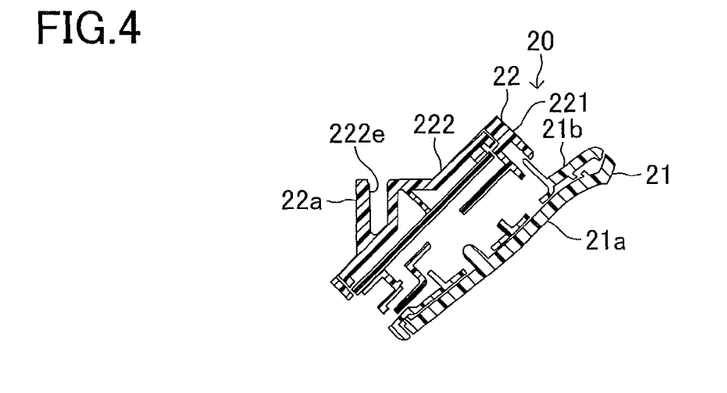
FIG. 4 is a cross-sectional view of section B-B of FIG. 2.

FIG. 2 is a view of the paddle shift member 20R (hereinafter referred to as "the paddle shift 20") installed to the right side section in FIG. 1 of the steering wheel 1, FIG. 3 is a cross-sectional view of section A-A of FIG. 2, and FIG. 4 is a cross-sectional view of section B-B of FIG. 2. As shown in these Figures, the paddle shift member 20 comprises an operation knob 21 and an internal housing 22. The operation knob 21 corresponds to the flat-shaped operation part of the present invention. The operation knob 21 is a flat member formed like a paddle shape, and has an operation surface 21a pressed by the driver using his/her finger. The inner housing 22 corresponds to the housing of the present invention. The inner housing 22 is disposed on an installation surface 21b, which is the surface on the side opposite the operation surface 21a of the operation knob 21. A switch (not shown) is housed inside the inner housing 22. The switch transmits the operation state of the operation knob 21 to the transmission of the vehicle. The inner housing 22 is arranged on the installation surface 21b of the operation knob 21 so that the operation knob 21 and the inner housing 22 are disposed in close proximity. With this configuration, the paddle shift member 20 can be formed compactly.

The operation knob 21 is connected to the inner housing 22 so as to be rotatable (swingable) in an amount equivalent to a predetermined angle. When the driver presses the operation surface 21a of the operation knob 21, the operation knob 21 swings and the switch housed inside the inner housing 22 is pressed by the operation knob 21. As a result, a signal that represents the operation state of the operation knob 21 is outputted from the switch, causing the transmission to shift gears.

Figure 5:
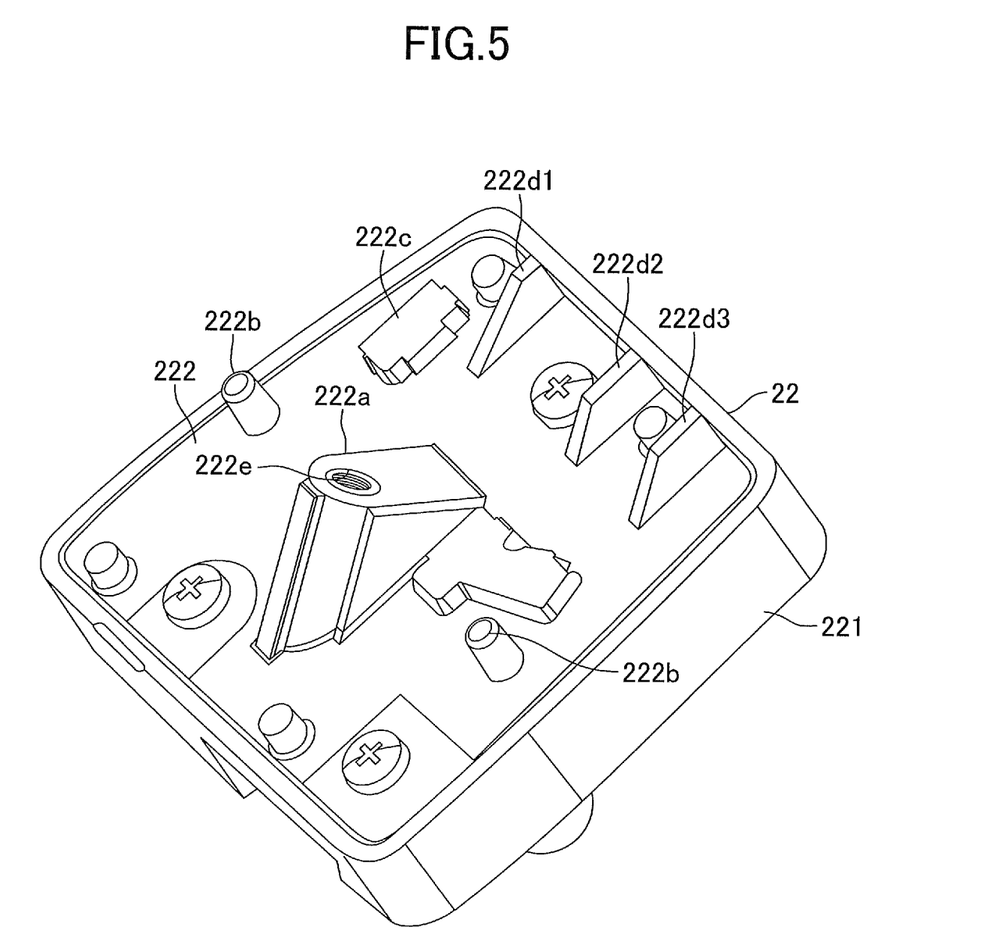
FIG. 5 is a perspective view showing the bottom surface part of the inner housing.

A small gap for allowing the swing of the operation knob 21 is partially formed between the inner housing 22 and the installation surface 21*b* of the operation knob 21. The inner housing 22 comprises a side peripheral part 221 that forms a side wall in four directions, and a bottom surface part 222 that closes the opening of the edge of the side peripheral part 221. The switch is housed within a chamber formed by the side peripheral part 221 and the bottom surface part 222. FIG. 5 is a perspective view showing the specific shape of the outer surface of the bottom surface part 222 of the inner housing 22. As shown in FIG. 5, a boss part 222*a*, positioning pins 222*b*, 222*b*, a positioning convex part 222*c*, and ribs 222*d*1, 222*d*2, and 222*d*3 are formed on the outer surface of the bottom surface part 222. The boss part 222*a* is formed like triangular shape and protrudes at the substantial center of the bottom surface part 222. A hole 222*e*, into which a screw member is screwed, is formed on the boss part 222*a*. The hole 222*e* extends along a diagonal direction from the bottom surface part 222 so as to be formed along one side of the triangular-shaped boss part 222*a*. The hole 222*e* corresponds to the hole formed on the bottom surface of the housing of the present invention.

The positioning pins 222*b*, 222*b* extend vertically from the bottom surface part 222. Two positioning pins 222*b*, 222*b* are located at symmetrical positions across the boss part 222*a*. The positioning convex part 222*c* is formed in the right upper area in FIG. 2 of the bottom surface part 222. The positioning convex part 222*c* protrudes from the bottom surface part 222. A cross section shape of the positioning convex part 222*c* appears generally in the shape of a pot. The positioning pins 222*b*, 222*b* and the positioning convex part 222*c* engage to positioning holes 123, 123 and a positioning concave part 124 respectively formed on a wheel lower cover 12 described below, so as to position the paddle shift member 20 to the wheel lower cover 12. The positioning pins 222*b*, 222*b* and the positioning convex part 222*c* correspond to the housing side positioning means of the present invention. The ribs 222*d*1, 222*d*2 and 222*d*3 are formed vertically from the right edge in FIG. 2 of the bottom surface part 222. The ribs 222*d*1, 222*d*2 and 222*d*3 extend from the right edge to a predetermined position leftward so as to form a wall. The three ribs 222*d*1, 222*d*2, and 222*d*3 are disposed in parallel at a predetermined interval. The rib 222*d*2 and the rib 222*d*3 correspond to the convex part of the present invention. These ribs 222*d*2 and 222*d*3 have opposing surfaces, and a spoke part 113 (A) described later is inserted therebetween.

Figure 6:
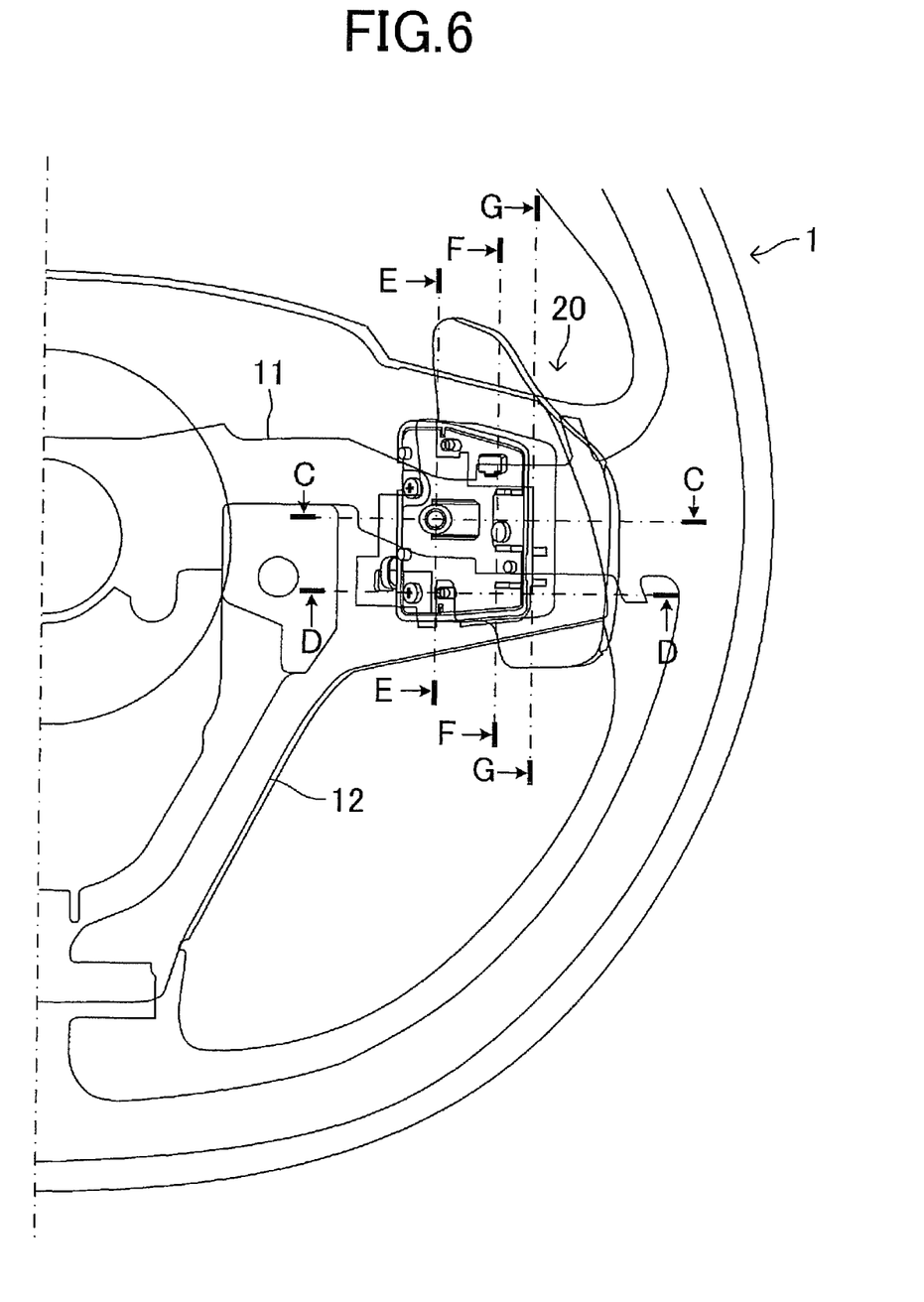
FIG. 6 is a partial view of a steering wheel according to the present embodiment, showing a part of the right half of the steering wheel to which the paddle shift member has been installed, along with the inner structure.
Figure 7:
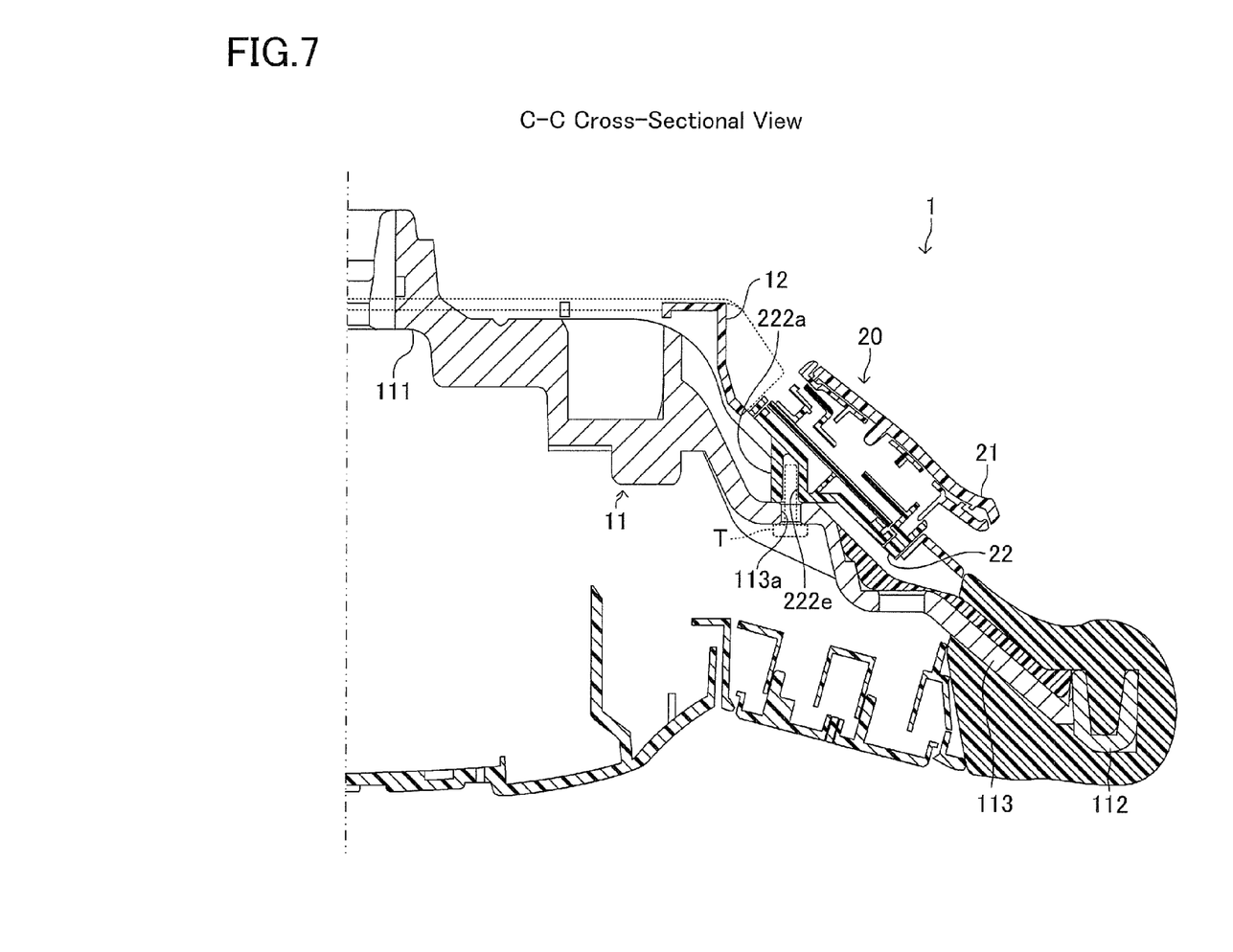
FIG. 7 is a cross-sectional view of section C-C of FIG. 6.
Figure 8:
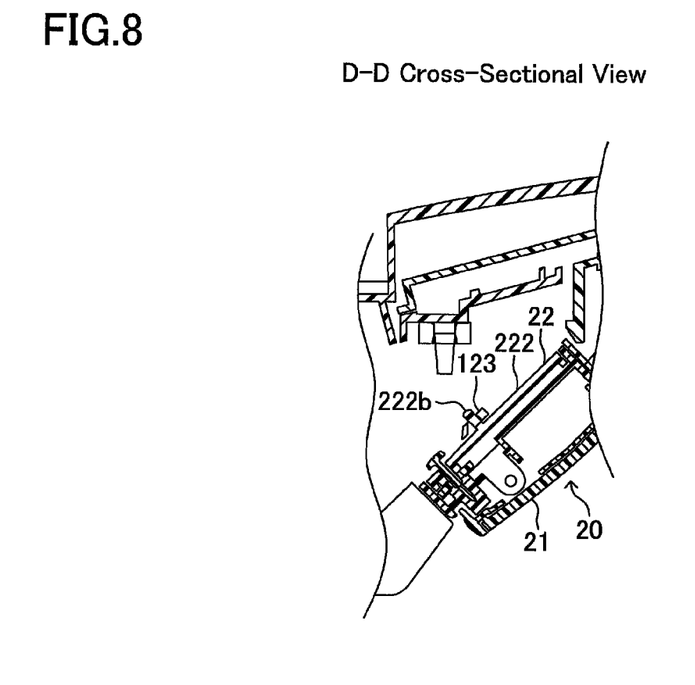
FIG. 8 is a cross-sectional view of section D-D of FIG. 6.
Figure 9:
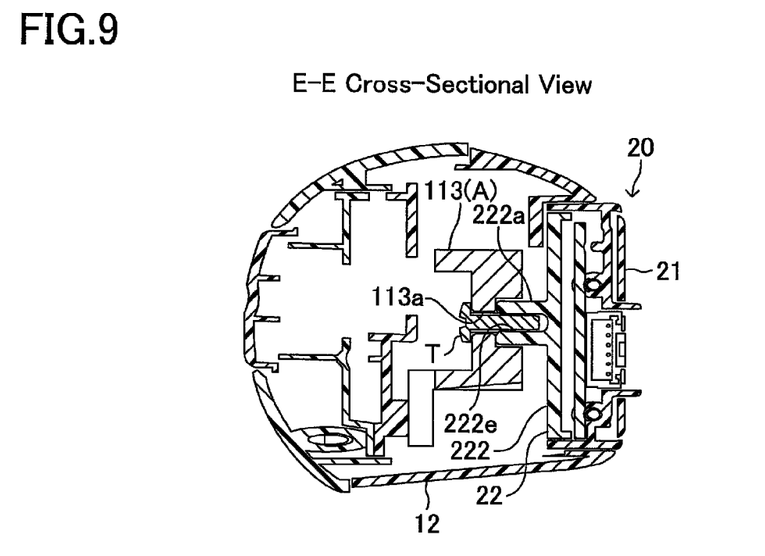
FIG. 9 is a cross-sectional view of section E-E of FIG. 6.
Figure 10:
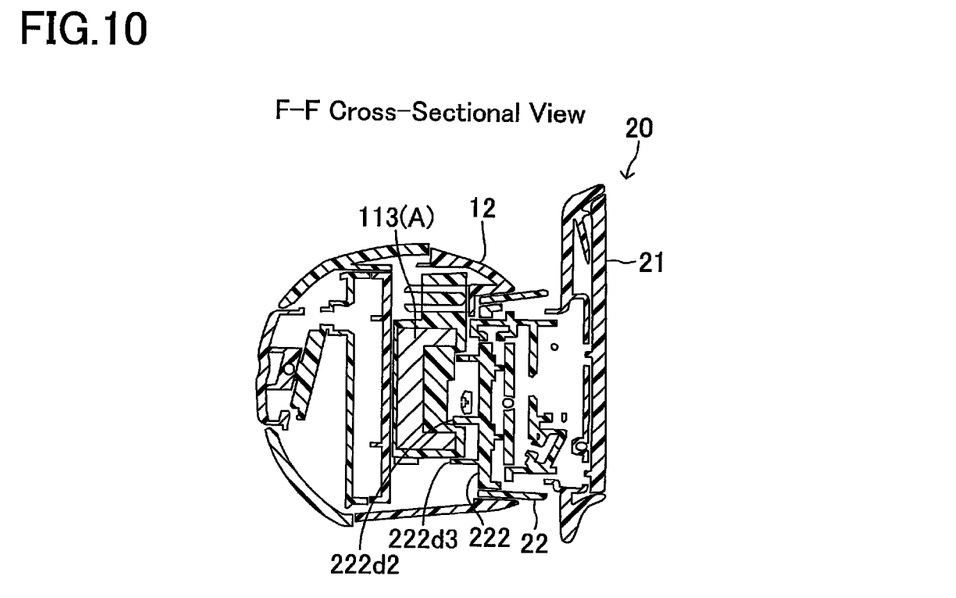
FIG. 10 is a cross-sectional view of section F-F of FIG. 6.
Figure 11:
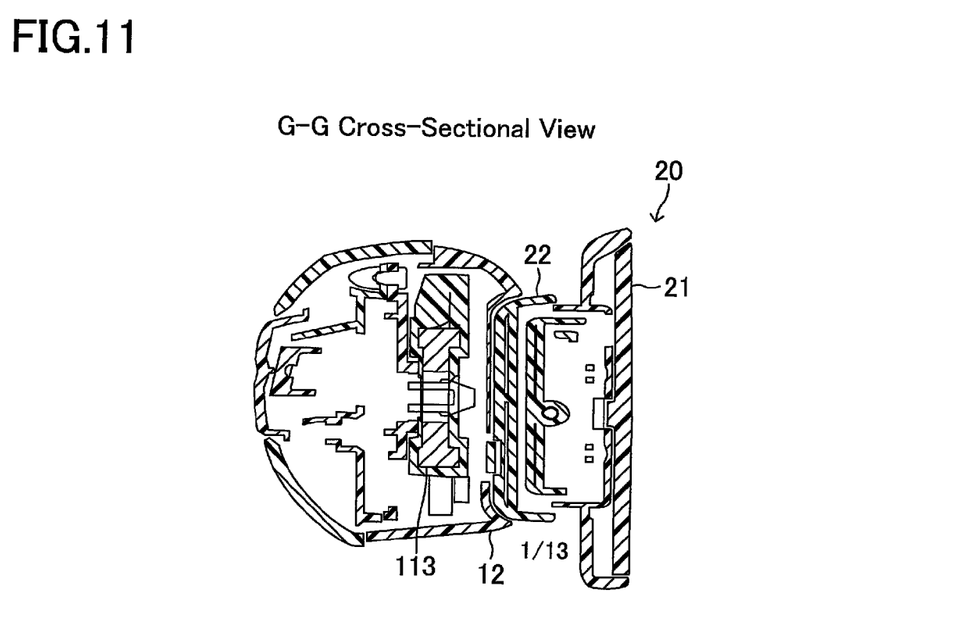
FIG. 11 is a cross-sectional view of section G-G of FIG. 6.
Figure 12:
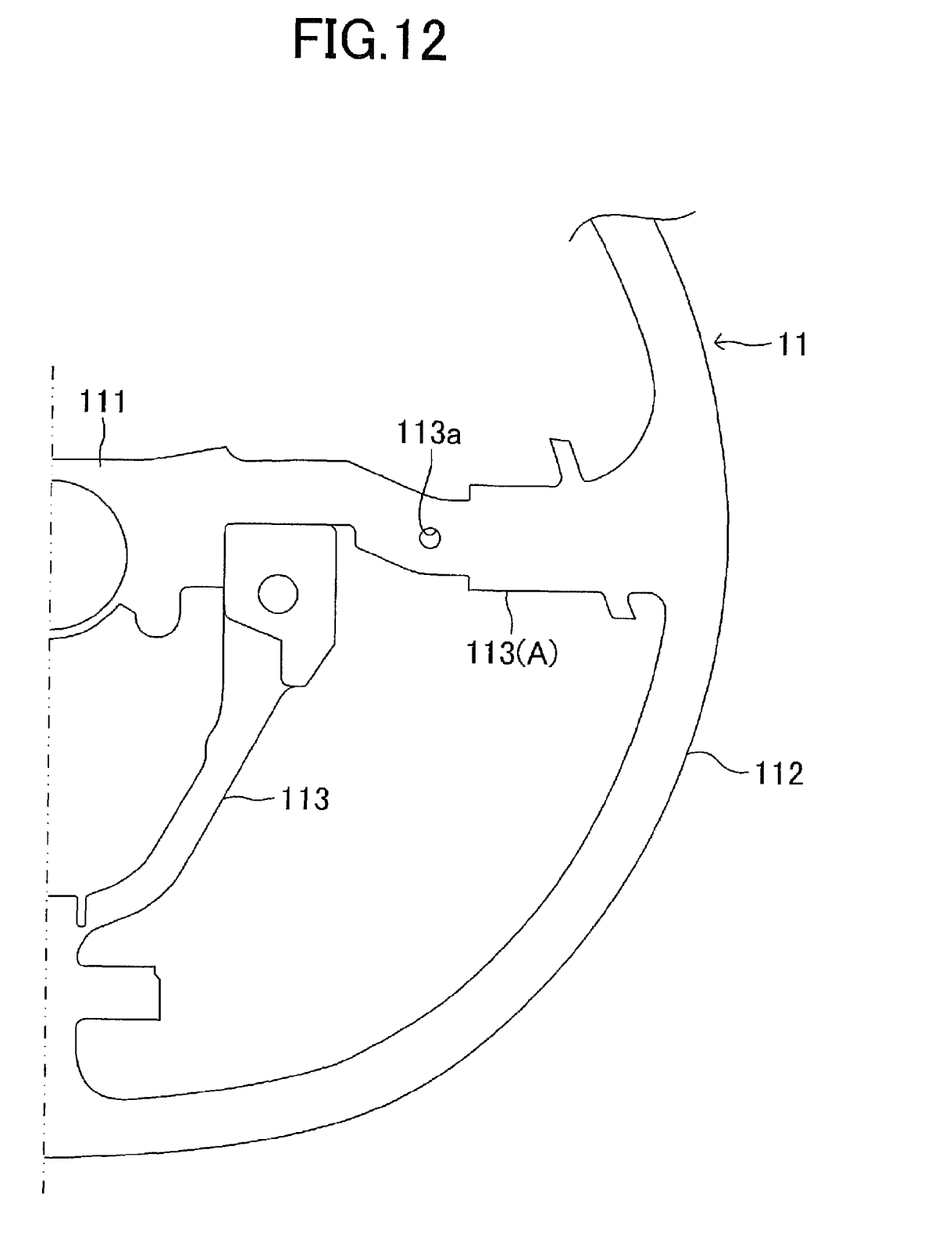
FIG. 12 is a diagram showing the core of FIG. 6.

FIG. 6 shows a part of the right half of the steering wheel 1 wherein the paddle shift member 20 is installed, along with the internal structure, FIG. 7 shows a cross-sectional view of section C-C of FIG. 6, FIG. 8 shows a cross-sectional view of section D-D of FIG. 6, FIG. 9 shows a cross-sectional view of section E-E of FIG. 6, FIG. 10 shows a cross-sectional view of section F-F of FIG. 6, and FIG. 11 shows a cross-sectional view of section G-G of FIG. 6. As shown in FIG. 6B the steering wheel 1 comprises a core 11 wherein a framework of the steering wheel 1 is formed. The core 11 corresponds to the steering wheel main body of the present invention. FIG. 12 is an extracted view of the core 11 of FIG. 6. As understood from FIG. 12, the core 11 comprises a boss part 111, a rim part 112, and a spoke part 113. The boss part 111 is positioned at the substantial center of the core 11. The boss part 111 is connected to the end portion of the steering shaft (not shown) of the vehicle. The rim part 112 surrounds the boss part 111 in a ring shape. The rim part 112 corresponds to the gripping part of the present invention and is gripped by the driver. The spoke part 113 is formed between the boss part 111 and the rim part 112. The boss part 111 and the rim part 112 are connected via the spoke part 113. A through-hole 113*a* is formed at the substantial center of the spoke part 113(A) that extends rightward in the figure from the boss part 111. As understood from FIG. 7, a resin cover is installed around the periphery of the rim part 112 and on the spoke part 113.

Figure 13:
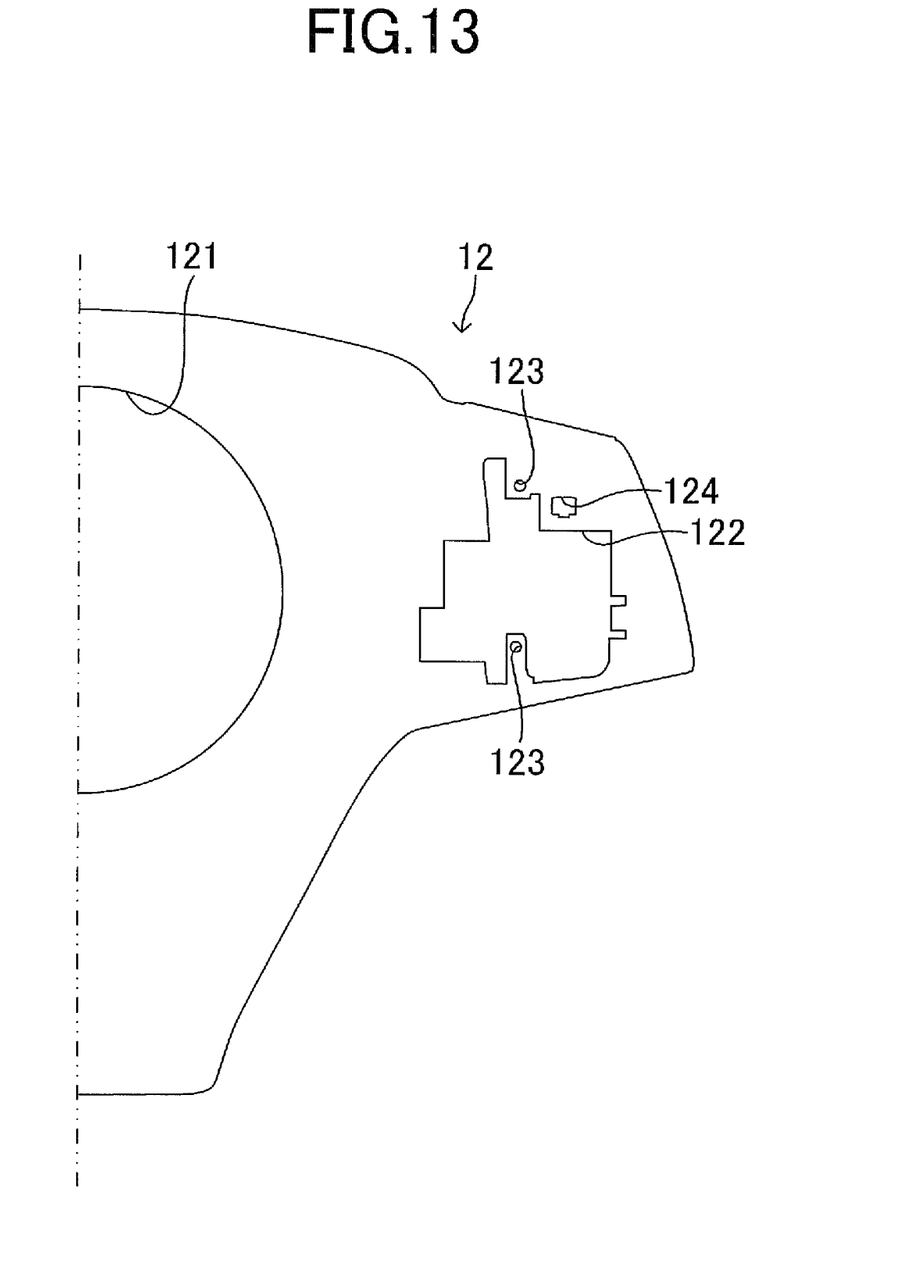
FIG. 13 is a diagram showing the wheel lower cover of FIG. 6.

As shown in FIG. 6, the steering wheel 1 comprises the wheel lower cover 12. The wheel lower cover 12 is mounted to the rear surface side of the core 11. The rear surface side of the core 11 refers to the surface side opposite the driver's side. FIG. 13 is an extracted view of the wheel lower cover 12 of FIG. 6. The wheel lower cover 12 exhibits a substantially inverted triangular shape overall when viewed from the front. As understood from FIG. 13, a large hole 121 is formed at the center of the wheel lower cover 12. The boss part 111 and the steering shaft of the vehicle are inserted through the large hole 121. Further, an irregular-shaped hole part 122 is formed in the rightward direction of the wheel lower cover 12 in the FIG. 13. When the paddle shift member 20 is positioned at the wheel lower cover 12 as described below, the bottom surface part 222 of the inner housing 22 is exposed from the front surface side of the wheel lower cover 12 through the irregular-shaped hole part 122. Further, the two positioning holes 123, 123 and the positioning concave part 124 are formed on the periphery of the irregular-shaped hole part 122. The two positioning holes 123, 123 are disposed so that the positioning pins 222*b*, 222*b* formed on the bottom surface part 222 of the inner housing 22 can be respectively inserted therethrough. The positioning concave part 124 is formed into a shape similar to the cross-sectional shape of the positioning convex part 222*c* formed on the bottom surface part 222 of the inner housing 22. The positioning concave part 124 is engaged to the positioning convex part 222*c* when the positioning pins 222*b*, 222*b* are inserted through the two positioning holes 123. The positioning holes 123, 123 and the positioning convex part 124 correspond to the lower cover side positioning means of the present invention.

Figure 14:
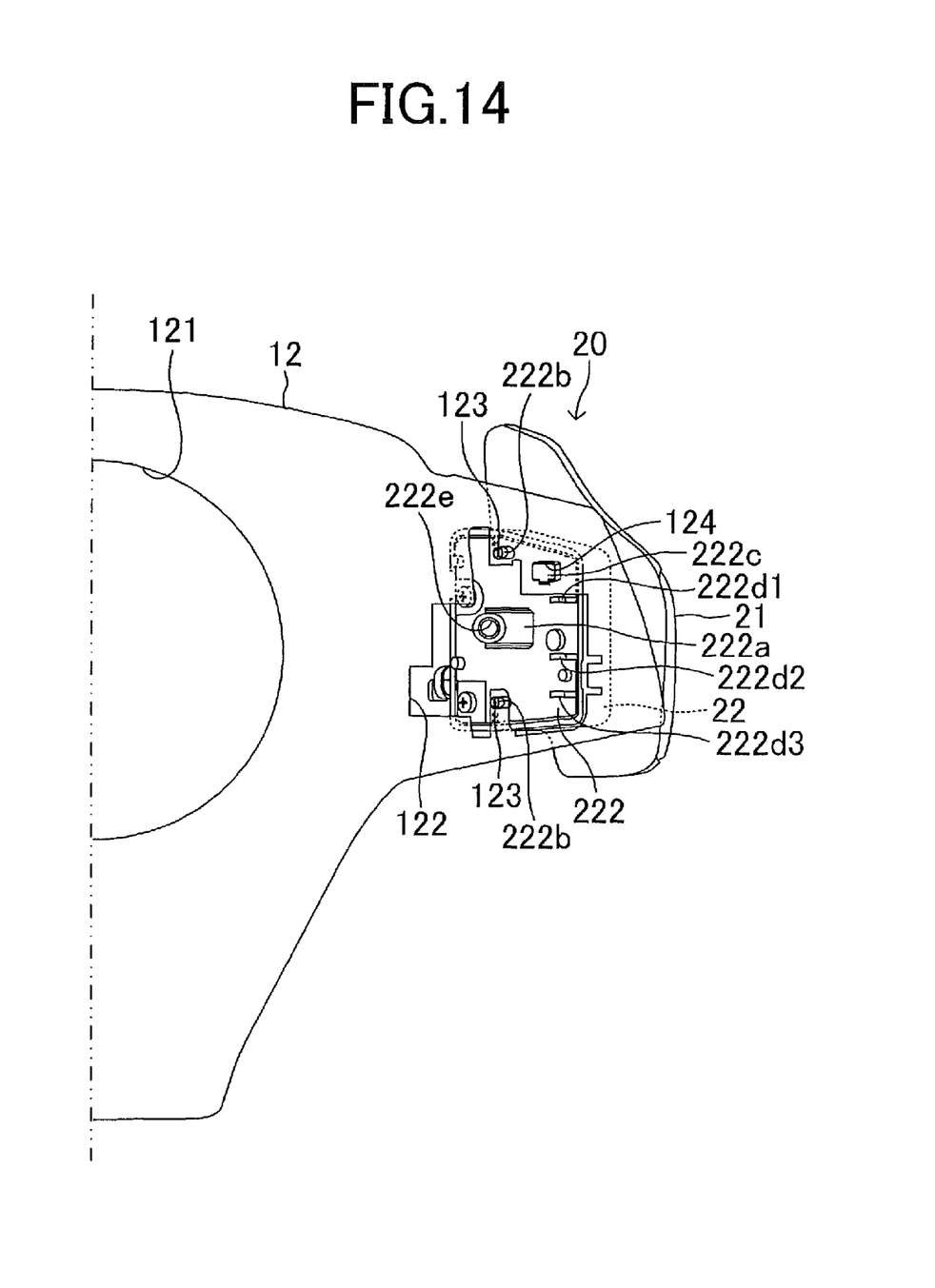
FIG. 14 is a diagram showing the wheel lower cover and the paddle shift member which is positioned and temporarily fixed to the wheel lower cover.

To assemble the paddle shift 20 to the steering wheel 1, first the worker engages the paddle shift member 20 to the wheel lower cover 12, thereby positioning the paddle shift member 20 to the wheel lower cover 12 (positioning step). In this step, the paddle shift member 20 is engaged to the wheel lower cover 12 from the rear surface side of the wheel lower cover 12. The rear surface side of the wheel lower cover 12 is the surface side opposite the surface side facing to the rear surface side of the core 11 where the wheel lower cover 12 is installed to the rear surface of the core 11. At this time, the two positioning pins 222*b*, 222*b* formed on the bottom surface part 222 of the inner housing 22 are inserted from the rear surface side of the wheel lower cover 12 into the positioning holes 123, 123 formed on the wheel lower cover 12 (refer to FIG. 8). Further, the positioning convex part 222*c* formed on the bottom surface part 222 is engaged to the positioning concave part 124 formed on the wheel lower cover 12. In this manner, the paddle shift member 20 is engaged to the wheel lower cover 12 at a plurality of locations so as to temporarily fix and position the paddle shift member 20 to a specific position on the rear surface side of the wheel lower cover 12, as shown in FIG. 14. As shown in FIG. 14, a large section of the bottom surface part 222 of the inner housing 22 is exposed from the irregular-shaped hole part 122 of the wheel lower cover 12 on the front surface side of the wheel lower cover 12 by positioning the paddle shift member 20 to the wheel lower cover 12. Specifically, the boss part 222*a*, the hole 222*e*, and the ribs 222*d*1, 222*d*2, and 222*d*3 formed on the bottom surface part 222 are exposed on the front surface side of the wheel lower cover 12. As a result, at least the boss part 222*a*, the hole 222*e*, and the ribs 222*d*1, 222*d*2, and 222*d*3 can be seen from the front surface side of the wheel lower cover 12.

Next, the worker installs the wheel lower cover 12, to which the paddle shift member 20 has been positioned and temporarily fixed, to a jig. The jig is used for fixing the wheel lower cover 12 under the state that the front surface side of the wheel lower cover 12 faces to the worker. Any jig may be used which has such a function.

Figure 15:
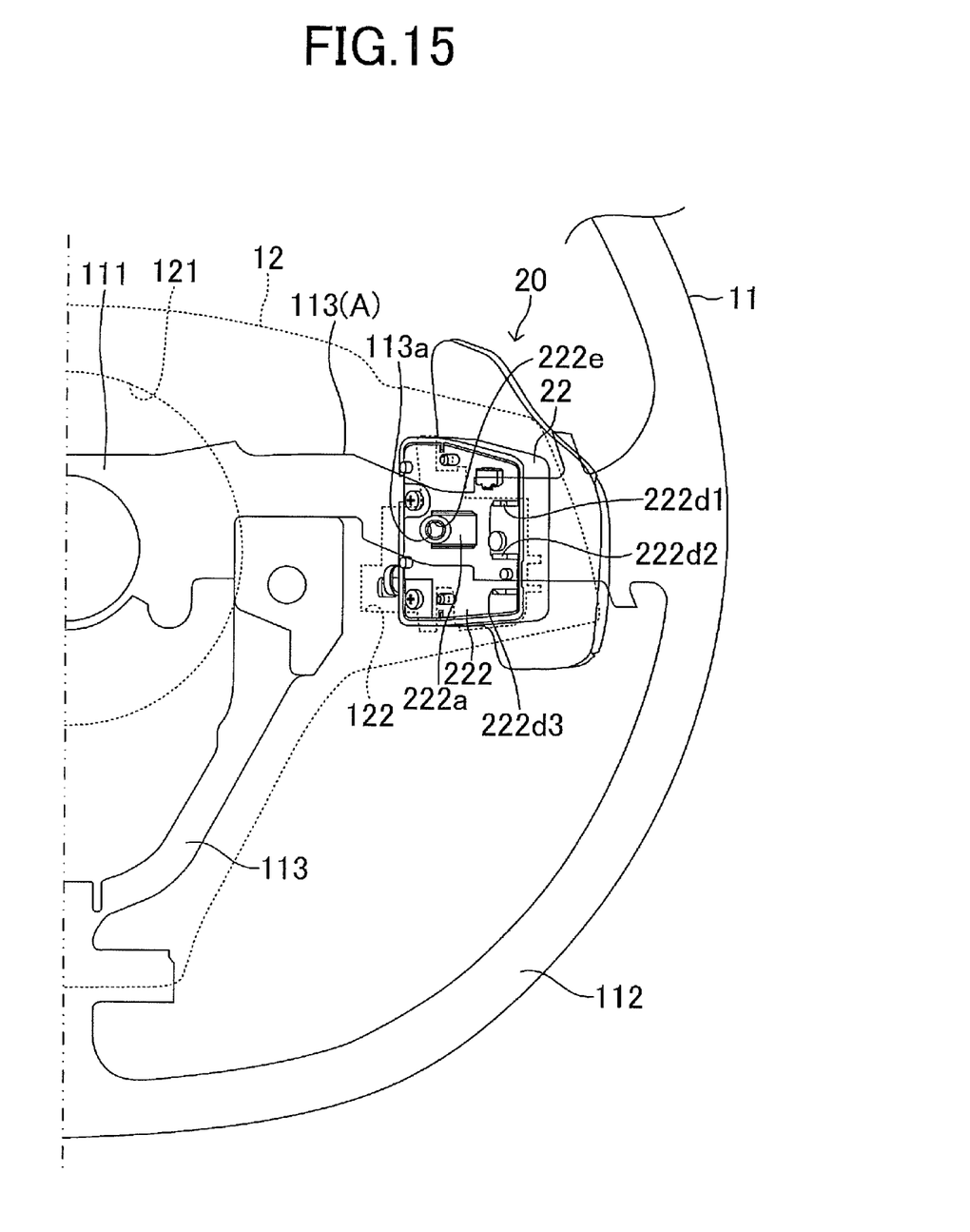
FIG. 15 is a diagram showing the core and the wheel lower cover which is installed to the core.

Next, the worker installs the wheel lower cover 12, to which the paddle shift member 20 has been positioned and engaged, to the core 11 (and the resin cover that covers this core) (lower cover installing step). At this time, the worker is positioned on the front surface side of the core 11. The worker grabs the core 11 from the front surface side, and presses the core 11 to the wheel lower cover 12 installed to the jig. Then, the worker installs the wheel lower cover 12 to the rear surface side of the core 11 by tightening bolts, etc. A plurality of connecting holes (not shown) are formed in opposing locations on the core 11 and the wheel lower cover 12, respectively, and the worker tightens bolts at these connecting holes, thereby installing the wheel lower cover 12 to a predetermined position on the core 11. FIG. 15 shows the state in which the wheel lower cover 12 is installed to the core 11. As shown in FIG. 15, the bottom surface part 222 of the inner housing 22 of the paddle shift member 20 exposed from the irregular-shaped hole part 122 of the wheel lower cover 12 faces the spoke part 113 (A) of the core 11. The opening part of the hole 222*e* provided on the boss part 222*a* formed on the bottom surface part 222 faces the through-hole 113*a* formed on the spoke part 113 (A). The spoke part 113 (A) and the resin cover that covers the spoke part 113 (A) are sandwiched between the two ribs 222*d*2 and 222*d*3 formed on the bottom surface part 222. As well shown in FIG. 10, the cross-sectional shape of the spoke part 113 (A) is in the shape of the letter "u," facing sideways. The lower horizontal part of this u-shaped cross-section (and the resin cover that covers this part) is positioned between the two ribs 222*d*2 and 222*d*3. With this arrangement, the ribs 222*d* and 222*d*3 are engaged with the core 11.

After installing the wheel lower cover 12 to the core 11 in the above-described lower cover installing step, the worker connects the paddle shift member 20 to the core 11 to which the wheel lower cover 12 is installed, using a tapping screw (connecting step). The hole 222*e* formed on the boss part 222*a* and the through-hole 113*a* of the spoke part 113 (A) face each other as described above (refer to FIG. 9). Thus, the worker stands on the front surface side of the core 11, inserts a tapping screw T from the front surface side of the core 11 (refer to FIG. 9) into the through-hole 113*a* of the spoke part 113 (A), and screws the tapping screw T into the hole 222*e* of the boss part 222*a*. As a result, the core 11 and the paddle shift member 20 are fixed together. At this time, the spoke part 113 (A) is sandwiched between the two ribs 222*d*2 and 222*d*3 and engaged thereto, thereby preventing the paddle shift member 20 from co-turning around the hole 222*e* with the tapping screw T when the tapping screw T is screwed. Thus, the position of the paddle shift member 20 is not shifted due to co-turning, even if only one tapping screw is used for connecting.

Then, after installing the paddle shift member 20 to the core 11, the worker performs subsequent work, such as installing the horn and air bag to the front surface side of the core 11, and fixing a relay connector part (not shown) provided at the tip of a harness (not shown) to be connected to a switch housed within the inner housing 22 of the paddle shift member 20 to the wheel lower cover 12. This work can be performed from the front surface side of the core 11.

Figure 16:
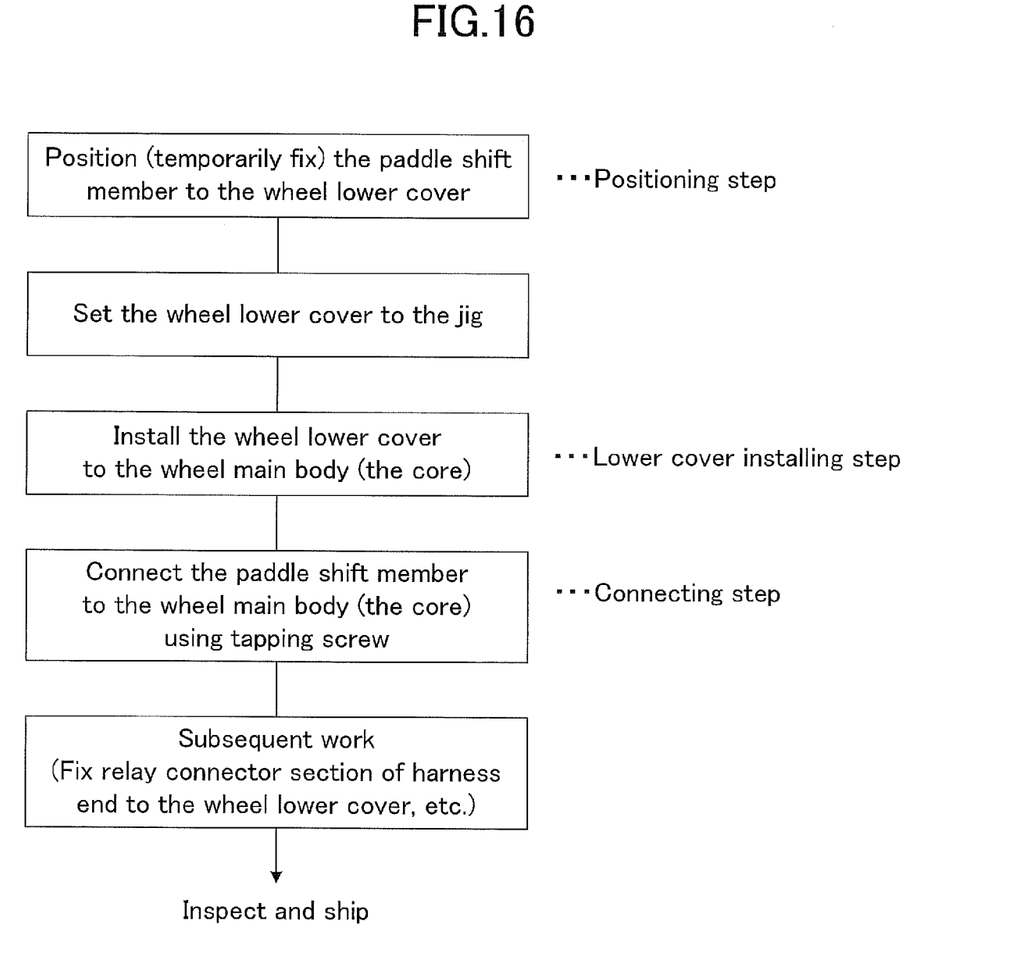
FIG. 16 is a flowchart showing the manufacturing steps of the steering wheel of the present embodiment.
Figure 17:
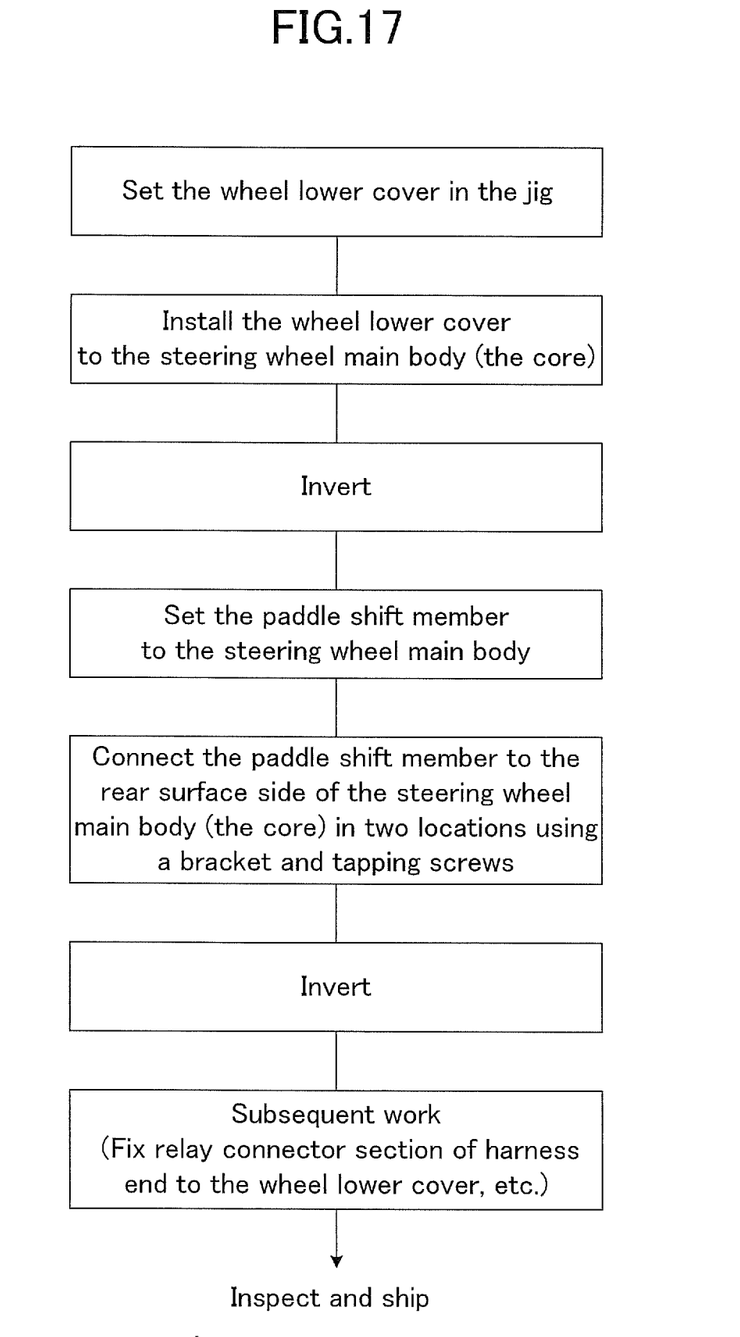
FIG. 17 is a flowchart showing the manufacturing steps of a steering wheel of prior art.

As describe above, the assembly method of the paddle shift member 20 according to the present embodiment includes the positioning step of positioning the paddle shift member 20 to a specific position on the rear surface side of the wheel lower cover 12 by engaging the paddle shift member 20 to the wheel lower cover 12, a lower cover installing step of installing the wheel lower cover 12 to which the paddle shift member 20 has been positioned and engaged to the rear surface side of the core 11, and the connecting step of connecting the paddle shift member 20 to the rear surface side of the core 11 by screwing the tapping screw T into the paddle shift 20 via the core 11 from the front surface side of the core 11 to which the wheel lower cover 12 has been installed. FIG. 16 is a flowchart showing a flow of steps for assembling the paddle shift member 20 to the core 11. As described in the embodiment, the tapping screw T (screw member) is screwed into the paddle shift member 20 via the core 11 from the front surface side of the core 11 by the worker positioned on the front surface side of the core 11. Therefore, the paddle shift member 20 can be assembled to the steering wheel main body including the core 11 without inverting the steering wheel main body. Also, the subsequent work after assembling the paddle shift member 20 to the steering wheel main body can be performed without inverting the steering main body. On the other hand, the conventional assembly method, as shown in the flowchart of FIG. 17, requires that the worker invert the steering wheel main body (core) in the step of assembling the paddle shift member 20 and before the subsequent work. Thus, according to the method of the present embodiment, the number of assembly man-hours can be decreased by omitting the step of inverting the steering wheel main body.

Further, the paddle shift member 20 comprises the flat-shaped operation knob 21 operated by the driver, and the inner housing 22 that houses the switch for transmitting the operation state of the operation knob 21 to the transmission of the vehicle. Furthermore, the inner housing 22 is disposed on the installation surface 21*b* of the operation knob 21, and comprises the side peripheral part 221 and the bottom surface part 222 for marking the chamber that houses the switch. Then, in the positioning step, the positioning pin 222*b* and the positioning convex part 222*c*, which correspond to the housing side positioning means, formed on the bottom surface part 222 of the inner housing 22 are engaged to the positioning hole 123 and the positioning concave part 124, which correspond to the lower cover side positioning means, formed on the wheel lower cover 12, thereby positioning the paddle shift member 20 to a specific position on the rear surface side of the wheel lower cover 12. As a result, the paddle shift member 20 is reliably positioned to the wheel lower cover 12.

Further, the core 11, which corresponds to the steering wheel main body, is consist of the boss part 111 connected to the steering shaft of the vehicle, the rim part 112 gripped by the driver (the gripped part), and the spoke part 113 that connects the boss part 111 to the rim part 112. Then, in connecting step, the tapping screw T is inserted through the through-hole 113*a* formed on the spoke part 113 (A) and screwed into the hole 222*e* formed on the bottom surface part 222 of the inner housing 22, thereby connecting the paddle shift member 20 to the spoke part 113. In this manner, the paddle shift member 20 is connected not to the boss part 111 but rather to the spoke part 113. Therefore, the space on the front surface side of the boss part 111 for storing the horn, air bag, etc. is ensured.

Further, the raised boss part 222*a* (raised part) is formed on the bottom surface part 222 of the inner housing 22. The hole 222*e* is formed on this boss part 222*a*. Then, the hole 222*e* formed on the boss part 222 is exposed on the front surface side of the wheel lower cover 12 by positioning the paddle shift member 20 to the wheel lower cover 12 in the positioning step. The hole 222e is positioned opposite the through-hole 113a in lower cover installing step. The tapping screw T is inserted through the through-hole 113a and screwed into the hole 222e so as to connect the core 11 and the paddle shift member 20 in connecting step. In this manner, the hole 222e is formed on the boss part 222a raised from the bottom surface part 222. Such a configuration can prevent the tapping screw T from reaching the inner space of the inner housing 22.

Further, the ribs 222d2 and 222d3 are formed vertically on the bottom surface part 222 of the inner housing 22. The ribs 222d2 and 222d3 are exposed on the front surface side of the wheel lower cover 12 by positioning the paddle shift member 20 to the wheel lower cover 12 in positioning step. The spoke part 113 (A) of the core 11 is sandwiched between the ribs 222d2 and 222d3 in lower cover installing step. The spoke part 113 (A) is engaged to the ribs 222d2 and 222d3 when the tapping screw T screws into the hole 222e in connecting step, thereby preventing the paddle shift member 20 from co-turning (turning concurrently) with the tapping screw T. As a result, the paddle shift member 20 is fixed with the steering wheel main body by single screw member without occurring co-turning. Thus, the number of parts can be decreased by using single screw member for fixing the paddle shift member 20 to the core 11. Furthermore, the strength of the wheel main body can be maintained even when the paddle shift member 20 is connected to the spoke part 113 which is relatively thin and inferior in strength. Further, the bracket that is necessary when two or more screw members are used for connecting is eliminated. Accordingly, the number of parts further decreases.

Further, according to the present embodiment, the inner housing 22 of the paddle shift member 20 is connected to the core 11 by the tapping screw T inserted from the front surface side of the spoke part 113 (A) of the core 11. In this manner, inverting step of inverting the core 11 is no longer necessary during assembling the paddle shift member 20 to the core 11. Thus, the number of assembly man-hours decreases.

Further, the paddle shift member 20 according to the present embodiment comprises the inner housing 22 and the flat-shaped (paddle-shaped) operation knob 21 having the operation surface 21a and the installation surface 21b. The inner housing 22 is formed on the installation surface 21b of the operation knob 21. In this configuration, paddle shift member 20 is constructed compactly. Furthermore, since the paddle shift member 20 is constructed compactly, it is possible to connect the paddle shift 20 to the spoke part 113 (A) of the core 11. Further, the bottom surface part 222 of the inner housing 22 is connected to the rear surface side of the spoke part 113 (A) by the tapping screw T inserted from the front surface side of the core 11. As a result, the worker can assemble the paddle shift 20 to the core 11 without inverting the core 11.

Further, the housing side positioning means (the positioning pin 222b and the positioning convex part 22c) that engage to the lower cover side positioning means (the positioning hole 123 and the positioning concave part 124) formed on the wheel lower cover 12 are formed on the bottom surface part 222 of the inner housing 22. As a result, the paddle shift 20 is reliably positioned to the wheel lower cover 12, making it possible to prevent any shift in the fixed position.

Further, the hole 222e and the ribs 222d2, 222d3 are formed on the bottom surface part 222 of the inner housing 22. The tapping screw T for connecting the paddle shift member 20 to the spoke part 113 (A) is screwed into the hole 222e. The ribs 222d2 and 222d3 engage to the spoke part 113 (A) when the tapping screw T is screwed into the hole 222e. When the wheel lower cover 12 is installed to the core 11, the spoke part 113 (A) is fit in between the opposing surfaces of the ribs 222d2 and 222d3, thereby engaging the spoke part 113 (A) to the ribs 222d2 and 222d3. As a result, the paddle shift member 20 does not co-turn even when the tapping screw T is screwed into the hole 222e. Further, because co-turning can be prevented in this manner, the paddle shift member 20 can be connected to the core 11 with using single screw member, thereby decreasing the number of tapping screws used. Further, the strength of the steering wheel main body is maintained even when a hole is formed on a thin part of the core11, such as on the spoke part 113 to connect the paddle shift member 20 to the core 11 via the hole. Furthermore, the bracket required for connection at a plurality of locations is not required. This makes it possible to further decrease the number of parts.

What is claimed is:

1. A method of assembling a gearshift member configured to shift gears of a transmission of a vehicle to a steering wheel having a steering wheel main body and a wheel lower cover installed to said steering wheel main body, said steering wheel main body having a boss part connected to a steering shaft of the vehicle, a gripping part gripped by a driver, and a spoke part configured to connect said boss part to said gripping part, said method comprising:

a positioning step of positioning said gearshift member by engaging said gearshift member to a rear surface of said wheel lower cover, so that a hole and a convex part formed on said gearshift member are exposed on a front surface side of said wheel lower cover;

a lower cover installing step of installing said wheel lower cover, to which said gearshift member has been positioned and engaged, to a rear surface side of said steering wheel main body, so that said hole faces a through-hole formed on said spoke part; and a connecting step of connecting said gearshift member to said rear surface side of said steering wheel main body by screwing a screw member into said hole via said through-hole from a front surface side of said steering wheel main body, so that said wheel lower cover is clipped between said steering wheel main body and said gearshift member;

wherein said convex part is configured to engage with said spoke part when said screw member is screwed into said hole in said connecting step, thereby preventing co-turning of said gearshift member.

2. The method of assembling a gearshift member according to claim 1, wherein:

said gearshift member comprises a flat-shaped operation part operated by a driver and a housing that houses a switch for transmitting an operation state of said operation part to the transmission of the vehicle;

said housing is disposed on one surface of said operation part; and in said positioning step, said gearshift member is positioned on the rear surface side of said wheel lower cover by engaging a housing side positioning means formed on a bottom surface of said housing to a lower cover side positioning means formed on said wheel lower cover.

3. The method of assembling a gearshift member according to claim 2, wherein said convex part and said hole are formed on a bottom surface of said housing.

* * * * *